Jan. 4, 1938.  S. J. ZAND  2,104,144
AIRPLANE DOOR CONSTRUCTION
Filed Sept. 26, 1935

INVENTOR
STEPHEN J. ZAND
BY
Herbert H. Thompson
HIS ATTORNEY.

Patented Jan. 4, 1938

2,104,144

UNITED STATES PATENT OFFICE 2,104,144

AIRPLANE DOOR CONSTRUCTION

Stephen J. Zand, Forest Hills, N. Y., assignor to Sperry Gyroscope Company, Inc., Brooklyn, N. Y., a corporation of New York Application September 26, 1935, Serial No. 42,221

6 Claims. (Cl. 244—129)

This invention relates, generally, to the construction of airplane doors, and the invention has reference, more particularly, to novel airplane door construction wherein means is provided for effectively sealing the door with respect to its frame, thereby preventing noise and outside air from access to the airplane interior or cabin.

Heretofore, considerable difficulty has been encountered in sealing airplane doors against objectionable noise and air currents, the latter being especially pronounced when flying from one altitude to another. Gaskets have heretofore been used in connection with airplane doors, but such gaskets leak due not only to varying outside air pressures resulting from the flying of the plane at various altitudes, but also due largely to the flexible or yieldable nature of the fuselage and the door frame carried thereby. Thus, while the door is generally of necessity built strong enough to withstand changes in air pressure resulting from changes in altitude, the fuselage and the door frame carried thereby are apt to yield, permitting passage of air and noise past the door gasket and into the cabin as well as permitting the escape of air therefrom, all of which is highly objectionable.

The principal object of the present invention is to provide a novel airplane door construction and particularly sealing means therefor which serves to effectively prevent the transmission of air and sound past the line of juncture of the airplane door and its frame.

Another object of this invention lies in the provision of a novel airplane door construction of the above character wherein gasket means is employed that is responsive to variations in atmospheric pressure due to varying altitudes and serves to effectively seal the door within its frame regardless of the altitude of flight and regardless of the flexibility or yieldability of the airplane fuselage and door frame.

Modern airplanes fly at altitudes of seldom less than 3000 feet and largely at 8000 feet, and the substantial pressure difference between these altitudes and that at ground level is employed in the novel construction of the present invention for effectively sealing the airplane door.

Other objects and advantages will become apparent from the specification, taken in connection with the accompanying drawing wherein one embodiment of the invention is illustrated.

In the drawing.

Similar characters of reference are used in the above figures to indicate corresponding parts.

Figure 1:
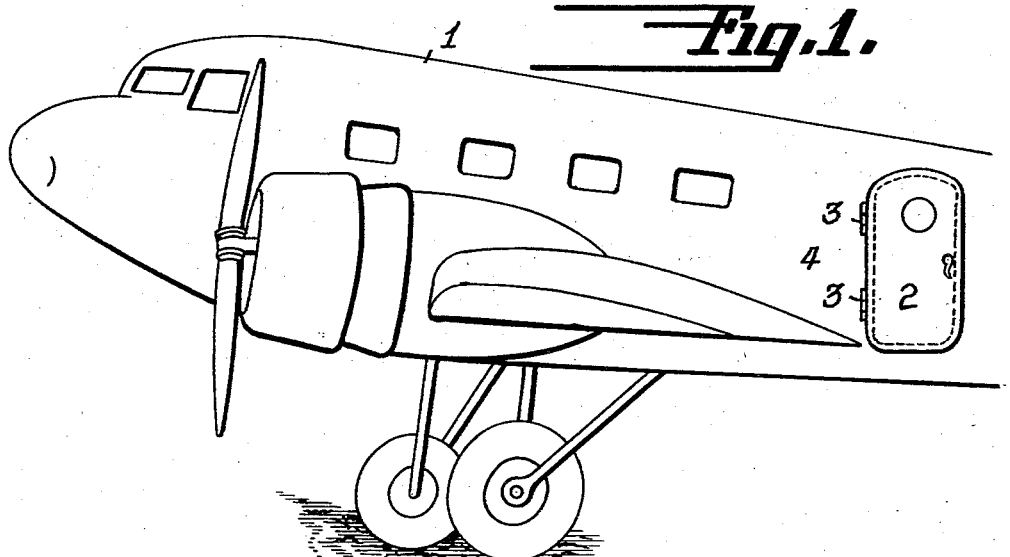
Fig. 1 is a fragmentary perspective view of a typical airplane employing the novel door construction of this invention.
Figure 2:
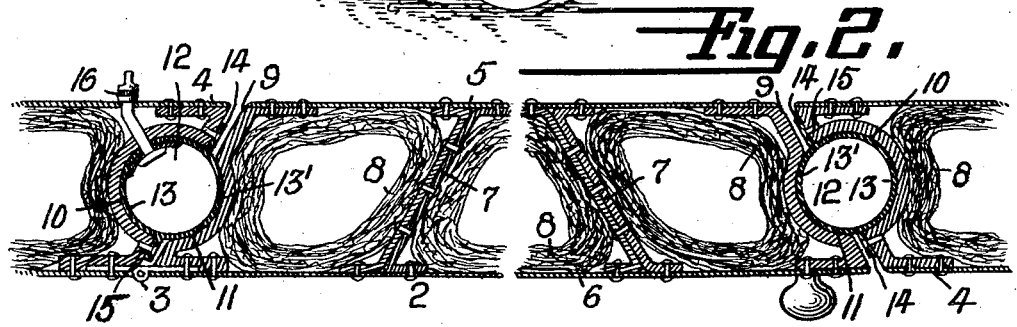
Fig. 2 is an enlarged transverse sectional view, with parts broken away, of the door and the surrounding door frame or cabin wall structure employed in the airplane of Fig. 1.

Referring now to the said drawing, the reference numeral 1 designates an airplane having a cabin door 2 designed and constructed for receiving the novel sealing means of this invention. The door 2 is similar in cross-section to a refrigerator door in that a transverse or vertical section thereof has the shape of a trapezium, as shown in Fig. 2, the same being hinged, as by hinges 3, to the door frame or surrounding cabin structure 4, forming a part of the airplane fuselage or cabin. The door 2 is shown as consisting of inner and outer panels 5 and 6 which are shown interconnected at intervals by spacing members or plates 7 which are preferably disposed diagonally with respect to the panels 5 and 6. Insulation 8, in the form of felted material, is illustrated as confined within the hollow interior of the door 2 and frame 4 and extends between panels 5 and 6.

According to the preferred arrangement, the diagonally inclined jamb portion of door frame 4 and the similarly inclined opposed door edge portion 9 are provided with complementary pockets or grooves 10, 11, respectively, which pockets or grooves taken together are of circular cross section. Although preferably these opposed pockets or grooves 10, 11 are shaped to thusly define a cylindrical passage or recess 12 extending completely around the door, which passage is shown of circular cross section, yet it is to be understood that this passage 12 may be of other suitable cross sections, such as elliptical. Preferably, the complementary pocket or groove 10 provided in the door frame or cabin wall 4 is of somewhat larger area than the pocket 11 provided in the edge portion of the door.

Extending within the cylindrical passage 12 is a pneumatic tube 13 which may be of rubber or other suitable flexible material, the same being formed with outwardly directed flanges 14 for enabling the same to be secured, as by screws 15, to the jamb portion of the door frame 4. The pneumatic tube 13 thus extends completely around the door and closes the line of juncture of the door with its frame. One or more pneumatic valves 16, similar to tire valves, extend from the interior of the fuselage or cabin into the pneumatic tube 13, thereby enabling the air pressure within the tube 13 to be controlled from within the cabin.

Thus, it will be noted that the pneumatic tube 13 is carried by the door frame and is fixed within the pocket 10 of such frame, said tube having a convex projecting portion 13' extending into the pocket 11 provided in the edge portion of the cabin door 2. The door 2 is furnished with the usual operating handles and lock or locks.

In use, the pneumatic tube 13 occupying the passage or space 12 preferably contains air at normal atmospheric pressure, the air having been admitted thereto with the plane on the ground by merely opening valve 16 and allowing air to enter the tube from the atmosphere, so that this tube assumes its normal circular or other intended shape. Since the tube thusly contains air at atmospheric pressure only, it is very easy to open the door with the airplane on the ground, inasmuch as the air pressure within the tube is the same as that on the outside, thereby permitting the projecting portion 13' of the tube to give way to the movement of the door. As the airplane ascends, however, the atmospheric pressure surrounding the plane will gradually decrease, and since the pressure within tube 13 remains constant, this tube will tend to expand and thereby firmly fit between the opposing walls of pockets 10 and 11, thereby securely sealing the joint between the door and its frame.

Thus, it will be seen that the pneumatic tube 13 is caused to conform to and firmly press both upon the door and upon the door frame during normal flight and serves not only to effectively seal the door against ingress and egress of air currents and sound regardless of any misalignment of the door and its jamb due, for example, to flexure of the cabin walls, but the tube 13 also acts as an additional lock to prevent the accidental opening of the door while the plane is in the air. This will be apparent when it is noted that while in the air the relatively flexible tube portion 13' is backed up by a relatively higher air pressure within tube 13 and hence is prevented from yielding, so that the door cannot be opened accidentally while the plane is in flight.

In the event that it is desired to open the door while in flight, as for the purpose of making a parachute jump or emergency exit, the valve 16 can be opened from within the cabin and the air pressure within pneumatic tube 13 released, thereby enabling the door to be opened.

Figure 3:
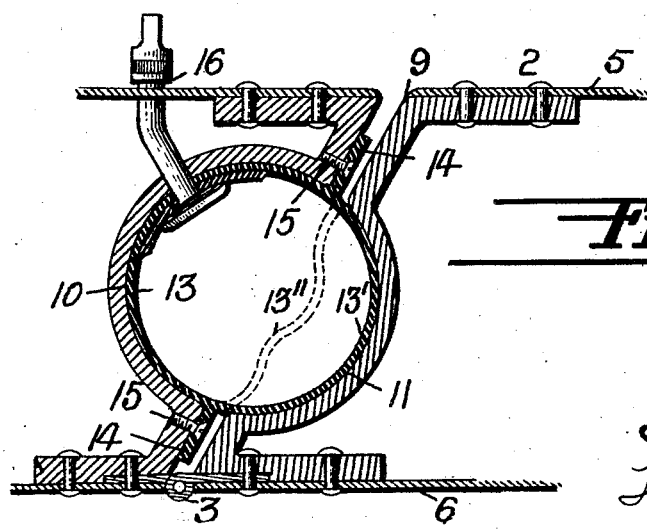
Fig. 3 is an enlarged fragmentary view of a portion of the structure of Fig. 2.

If desired, the pneumatic tube 13 may be only partially inflated when the airplane is on the ground, especially when the plane is to fly at very high altitudes, thereby causing the projecting portion 13' of the pneumatic tube to be deflected inwardly somewhat, as shown in dash lines in Fig. 3, and designated by the reference numeral 13''. In this event the door will be extremely easy to open when the plane is on the ground, while at the same time, when flying at high altitudes, the pressure within the tube 13 will be sufficient to greatly expand the same so that its portion 13'' abuts firmly against the grooved edge portion of the door. On the other hand, if the plane is to normally fly at comparatively low altitudes, the tube 13 may be initially inflated to somewhat more than normal atmospheric pressure by means of a suitable pump applied to valve or valves 16, in which case the juncture between the door and its frame will be effectively sealed by tube 13 at low flying altitudes. If desired, the valves 16 may extend to the outside instead of the inside of the cabin, in which case suitable mechanism would be employed for opening these valves from within the cabin.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In an airplane, a door and a surrounding door frame structure, said door and its frame structure having opposing grooves for providing a passage extending about said door, and a pneumatic tube within such passage for sealing the joint between the door and its frame at all cruising levels, said tube having means for securing the same to the door frame structure, and valve means connected to said tube to enable the changing of the air pressure within the same, so that upon landing the door may be opened at will, with the tube then serving as a cushion.

2. In a seal for a cabin door of an airplane, the combination with said door, a frame surrounding said door, said door having a groove extending around its marginal edge portion, said door frame having its jamb portion provided with a complementary groove for opposing the groove of said door, said door and said jamb portion grooves jointly providing a passage of substantially circular cross-section extending about said door, and a pneumatic tube contained within said passage, and means for inflating said tube.

3. In a seal for a cabin door of an airplane, the combination with said door, a frame surrounding said door, said door having a groove extending around its marginal edge portion, said door frame having its jamb portion provided with a complementary groove for opposing the groove of said door, said door and said jamb portion grooves jointly providing a passage of substantially circular cross-section extending about said door, and a pneumatic tube contained within said passage and attached to said jamb portion, the larger part of said tube being contained within said jamb portion groove for facilitating the opening of the door.

4. In a seal for a cabin door of an airplane, the combination with a door of substantially trapezium cross-section, a door frame having a door opening of trapezium cross-section for conformably receiving said door, the peripheral portion of said door and the jamb portion of said door frame having complementary, opposed grooves, the groove of said door frame jamb portion being of larger area than that of said door, a pneumatic tube within said door frame jamb portion groove for projecting into said door grooves to seal the joint between said door and its door frame, and valve means connected to said tube for enabling a desired air pressure to be provided therein.

5. An airplane cabin door as claimed in claim 2, in which said tube is partially collapsed at the ground level prior to takeoff, but contains sufficient air to become inflated at normal cruising levels without the addition of air therein.

6. In an airplane, a door and a surrounding door frame structure, said door and said door frame structure having opposing grooves for providing a passage extending about the door, and a pneumatic tube within said passage, the air pressure within said tube being such as to enable the door to be readily opened with the craft on the ground, the decrease in atmospheric pressure resulting from an ascent of the craft causing air within said tube to expand, whereby said tube effectively seals the joint between the door and its frame.

STEPHEN J. ZAND.